United States Patent
Vavrik et al.

(10) Patent No.: US 10,848,085 B2
(45) Date of Patent: Nov. 24, 2020

(54) SENSORLESS HOMING SYSTEM FOR STEPPER MOTOR SYSTEM

(71) Applicant: Robe Lighting s.r.o., Roznov pod Radhostem (CZ)

(72) Inventors: Jindrich Vavrik, Zubri (CZ); Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 16/654,929

(22) Filed: Oct. 16, 2019

(65) Prior Publication Data

US 2020/0052626 A1 Feb. 13, 2020

Related U.S. Application Data

(60) Provisional application No. 62/746,892, filed on Oct. 17, 2018.

(51) Int. Cl.
*F21V 21/30* (2006.01)
*H02P 8/32* (2006.01)

(52) U.S. Cl.
CPC ............... *H02P 8/32* (2013.01); *F21V 21/30* (2013.01)

(58) Field of Classification Search
CPC .................................. H02P 8/32; F21V 21/30
See application file for complete search history.

(56) References Cited

U.S. PATENT DOCUMENTS

| 2009/0231864 A1* | 9/2009 | Polasek ............... G05B 19/404 |
| | | 362/418 |
| 2012/0098473 A1 | 4/2012 | Nachev et al. |
| 2016/0013743 A1* | 1/2016 | Braat ........................ H02P 8/38 |
| | | 318/696 |
| 2016/0074618 A1* | 3/2016 | Foote ................. A61M 16/0003 |
| | | 128/204.23 |
| 2017/0373623 A1 | 12/2017 | Braat et al. |

FOREIGN PATENT DOCUMENTS

EP 1760875 A1 3/2007

OTHER PUBLICATIONS

Trinamic Motion Control GmbH & Co. KG; "TMC2041 Datasheet"; Rev. 1.02; May 16, 2017; Hamburg, Germany; 65 pages.
European Extended Search Report; Application No. 19203784.4; dated Apr. 9, 2020; 10 pages.

* cited by examiner

*Primary Examiner* — Cortez M Cook
(74) *Attorney, Agent, or Firm* — Conley Rose, P.C.; Grant Rodolph; Brooks W Taylor

(57) ABSTRACT

An automated luminaire and method are provided. The automated luminaire includes a stepper motor, a mechanism moved by the stepper motor, and a control system coupled to the stepper motor. The control system rotates the stepper motor, senses a current passing through a motor winding of the stepper motor, determines from a calculated characteristic of the sensed current that the mechanism has contacted an end stop, and in response, stores data relating to a current position of the stepper motor in a memory of the control system.

20 Claims, 5 Drawing Sheets

SENSORLESS HOMING SYSTEM FOR STEPPER MOTOR SYSTEM

CROSS-REFERENCE TO RELATED APPLICATIONS

This application claims priority to U.S. Provisional Application No. 62/746,892, filed Oct. 17, 2018 by Jindřich Vavřík, et al. entitled, "Sensorless Homing System for Stepper Motor System," which is incorporated by reference herein as if reproduced in its entirety.

TECHNICAL FIELD OF THE DISCLOSURE

The disclosure generally relates to an automated luminaire, and more specifically to a sensorless homing system for stepper motors for use in an automated luminaire.

BACKGROUND

Luminaires with automated and remotely controllable functionality are well known in the entertainment and architectural lighting markets. Such products are commonly used in theatres, television studios, concerts, theme parks, night clubs, and other venues. A typical product will commonly provide control over the pan and tilt functions of the luminaire allowing the operator to control the direction the luminaire is pointing and thus the position of the light beam on the stage or in the studio. Typically, this position control is done via control of the luminaire's position in two orthogonal rotational axes usually referred to as pan and tilt. Many products provide control over other parameters such as the intensity, color, focus, beam size, beam shape, and beam pattern.

SUMMARY

In one embodiment, an automated luminaire includes a stepper motor, a mechanism moved by the stepper motor, and a control system coupled to the stepper motor. The control system rotates the stepper motor, senses a current passing through a motor winding of the stepper motor, determines from a calculated characteristic of the sensed current that the mechanism has contacted an end stop, and in response, stores data relating to a current position of the stepper motor in a memory of the control system.

In another embodiment, a method determines a home position for a mechanism moved by a stepper motor. The method includes rotating a stepper motor and, while rotating the stepper motor, sensing a current passing through a motor winding of the stepper motor. The method also includes determining whether a portion of the sensed current varies from an expected value and, in response, calculating a characteristic of the portion of the current. The method further includes determining whether the calculated characteristic meets a predefined criterion representing the mechanism colliding with an end stop and, in response, storing data relating to a current position of the stepper motor in a memory of a control system.

In yet another embodiment, another method determines a home position for a mechanism moved by a stepper motor. The method includes rotating a stepper motor and, while rotating the stepper motor, sensing a current passing through a motor winding of the stepper motor. The method also includes determining whether a portion of the sensed current varies from an expected value and, in response, calculating a characteristic of the portion of the current. The method further includes determining whether the calculated characteristic meets a predefined criterion representing the mechanism colliding with an end stop and, in response, rotating the stepper motor in the reverse direction for a predetermined period. The method then includes rotating the motor in the first direction at a slower speed and, while rotating the motor at the slower speed, sensing a current passing through a motor winding of the stepper motor. While rotating at the slower speed, the method also includes determining whether a portion of the sensed current varies from an expected value and, in response, calculating a characteristic of the portion of the current. The method also includes determining whether a portion of the sensed current at the slower speed varies from an expected value and, in response, calculating a characteristic of the portion of the current. The method further includes determining whether the calculated characteristic at the slower speed meets a predefined criterion representing the mechanism again colliding with the end stop and, in response, storing data relating to a current position of the stepper motor in a memory of a control system.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Preferred embodiments are illustrated in the figures, like numerals being used to refer to like and corresponding parts of the various drawings.

Figure 1:
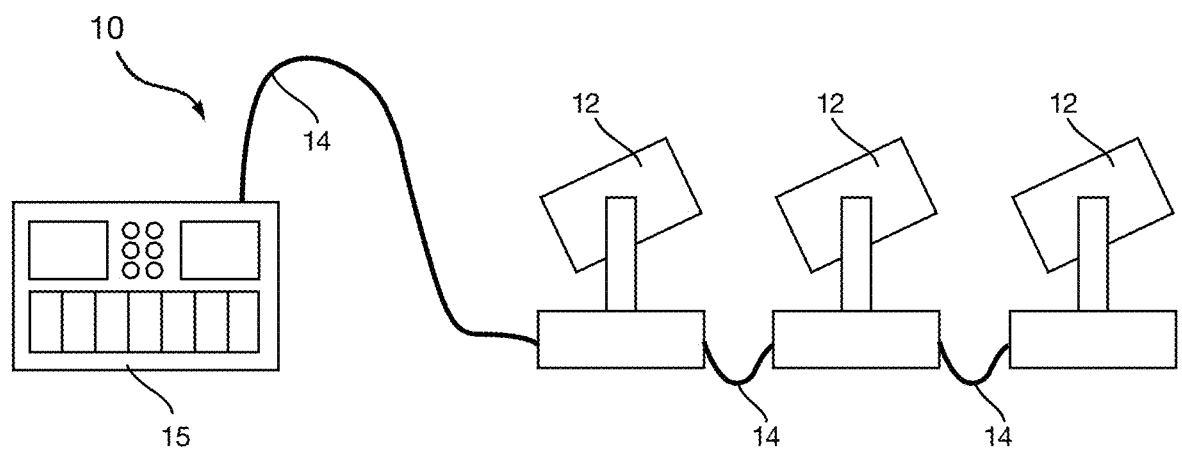
FIG. 1 illustrates a multiparameter automated luminaire system according to the disclosure.

FIG. 1 illustrates a multiparameter automated luminaire system 10 according to the disclosure. The multiparameter automated luminaire system 10 includes a plurality of multiparameter automated luminaires 12 according to the disclosure. The automated luminaires 12 each contain on-board a light source, one or more light modulation devices (e.g., a color filter, a gobo, a mechanical iris, a diffusion filter, a dimming mechanism), and pan and/or tilt systems to control an orientation of a beam of the automated luminaire 12. The automated luminaire 12 include a fixed enclosure, a yoke mechanism mounted for rotation about a first rotational axis, and a luminaire head mounted to the yoke for rotation about a second rotational axis orthogonal to the first rotational axis, where the luminaire head comprises the light source and light modulation devices. The automated luminaire 12 emits a light beam whose orientation is determined by the combined rotation of the yoke relative to the fixed enclosure and the luminaire head relative to the yoke. In other embodiments, an automated luminaire according to the disclosure may include a fixed enclosure that includes the light source and light modulation devices and emits a light beam that is reflected from a mirror mounted for rotation in two axes and whose orientation is controlled by an orientation of the mirror.

Mechanical drive systems to control parameters of the automated luminaire 12 include motors or other suitable actuators coupled to control electronics, as described in more detail with reference to FIG. 2. In addition to being connected to mains power either directly or through a power distribution system, each automated luminaire 12 is connected in series or in parallel via data link 14 to one or more control desks 15. An operator typically controls the parameters of the automated luminaires 12 via the control desk 15.

The automated luminaires 12 may include stepper motors to provide the movement for internal optical systems. Examples of such optical systems may include gobo wheels, effects wheels, and color mixing systems, as well as prism, iris, shutter, and lens movement systems.

A stepper motor is an extremely accurate device for relative movement. Each step of the stepper motor represents a fixed movement of the output shaft; thus, it is possible to move a stepper motor from one angular position to another target angular position with great precision. This allows, in turn, accurate positioning of stepper-driven mechanical systems within the automated luminaires 12.

To achieve this accuracy from power-on, a stepper motor requires a reference point from which it can measure all movements. In some stepper-driven mechanical systems, this is done either by providing sensors on the output shaft of the stepper motor or the connected mechanical system, or by allowing the motor shaft or the connected mechanical system to contact an end stop, such as a physical component of the automated luminaire 12 that is configured to physically prevent further motion by the motor or the connected mechanical system. When a sensor is used, sensors such as optical sensors, micro switches, or Hall effect sensors may be used. In all cases, finding this reference point is called homing, in that it provides a reference or 'home' position for the motor.

However, sensors add cost, can be prone to failure from dirt or wear and tear, and require re-alignment when the unit is repaired or maintained. Allowing a stepper-driven system to contact the end stop to provide a physical stop end-point is less prone to such problems. However, such a process may be noisy and may take a long time, as the optical system may repeatedly bang into the end stop. Because the control system has no knowledge of the initial position of the optical system, it is necessary for the control system to assume the worst case and move the optical system throughout its entire travel to ensure it has contacted the end stop, thus prolonging the amount of time the homing process takes and possibly the noise created by repeatedly banging into the end stop.

Disclosed herein is a homing system for an automated luminaire that allows accurate and repeatable homing of stepper motor systems without the use of sensors, without moving the optical system throughout its entire travel, unless needed, and without unneeded impacts with the end stop and the accompanying noise.

Figure 2:
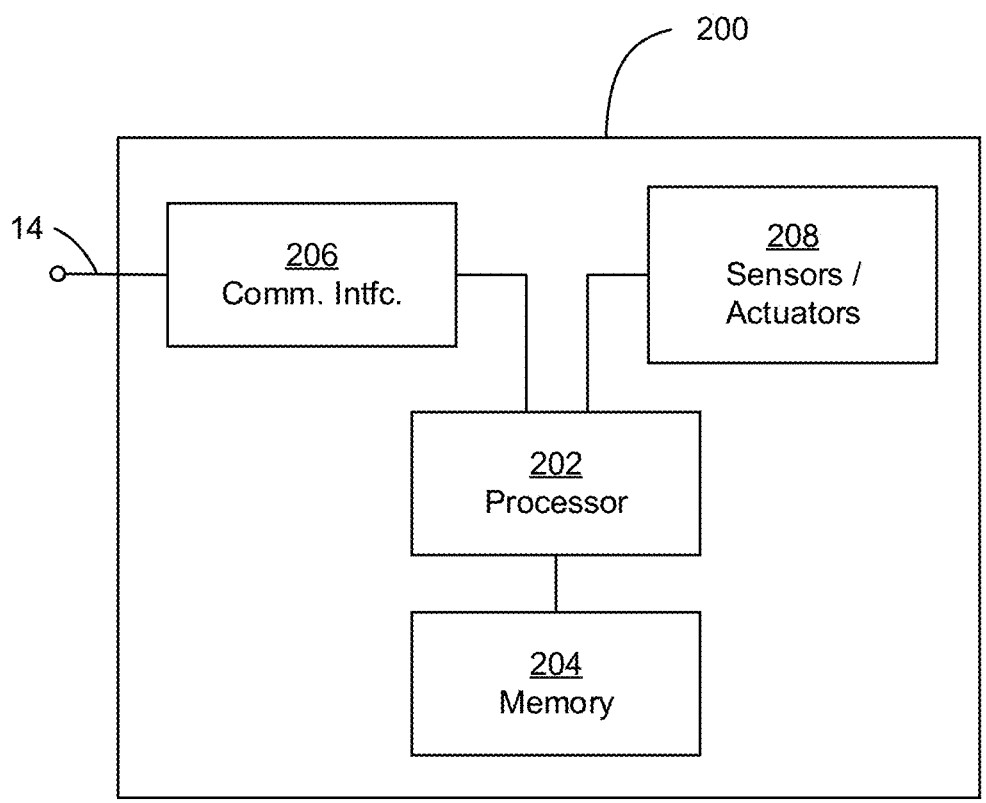
FIG. 2 presents a block diagram of a control system for an automated luminaire according to the disclosure.

FIG. 2 presents a block diagram of a control system (or controller) 200 for an automated luminaire 12 according to the disclosure. The control system 200 is suitable for use with the sensorless homing system 300 of FIG. 3 or other homing systems according to the disclosure. The control system 200 is also suitable for controlling other control functions of the automated luminaire system 10. The control system 200 includes a processor 202 electrically coupled to a memory 204. The processor 202 is implemented by hardware and software. The processor 202 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 202 is further electrically coupled to and in communication with a communication interface 206. The communication interface 206 is coupled to, and configured to communicate via the data link 14. The processor 202 is also coupled via a control interface 208 to one or more other sensors, motors, actuators, controls and/or other devices. The processor 202 is configured to receive control signals via the communication interface 206 and to control the sensorless homing system 300 and other mechanisms of the automated luminaire system 10 via the control interface 208.

The control system 200 is suitable for implementing processes, motion control, control of the motor currents and sensing the contact of a motor with a fixed stop, and other functionality as disclosed herein. Such control may be implemented as instructions stored in the memory 204 and executed by the processor 202. The memory 204 may be volatile and/or non-volatile and may be read-only memory (ROM), random access memory (RAM), ternary content-addressable memory (TCAM), and/or static random-access memory (SRAM). The memory 204 may comprise one or more disks, tape drives, and/or solid-state drives and may use such disks and drives as overflow data storage devices, to store programs when such programs are selected for execution, and to store instructions and data that are read during program execution.

The disclosed system implements a sensorless homing system through monitoring a current passing through the motor windings of the stepper motor. In some embodiments of the disclosure, the stepper motor operates in a micro-stepping mode. When operating in such a mode, the current applied to the motor windings may be sinusoidal in shape with a phase offset between the different windings. By inserting a resistor in series with the motor windings and measuring the voltage drop across the resistor, it is possible to obtain a signal relating to the current flow through the motor winding and compare it with an ideal current.

While the described embodiment discloses a sinusoidal motor current, the disclosure is not so limited. Other embodiments may use differently shaped control current curves, including, but not restricted to, sawtooth and modified sine curves. The curve shape may be varied from a perfect sinusoid so as to more accurately match the current with the magnetic and mechanical properties of the motor.

When the motor, or its connected (driven) mechanism, contacts an end stop the current waveform is disturbed by the voltage generated in the winding as its movement is interrupted. This disturbance appears as a ripple in the smooth current waveform. By passing the voltage across the current sense resistor through an analogue-to-digital converter (A-D converter), the control system 200 obtains a signal relating to the current waveform and can detect the disturbance and identify the exact moment when the optical system makes contact with the end stop.

Figure 3:
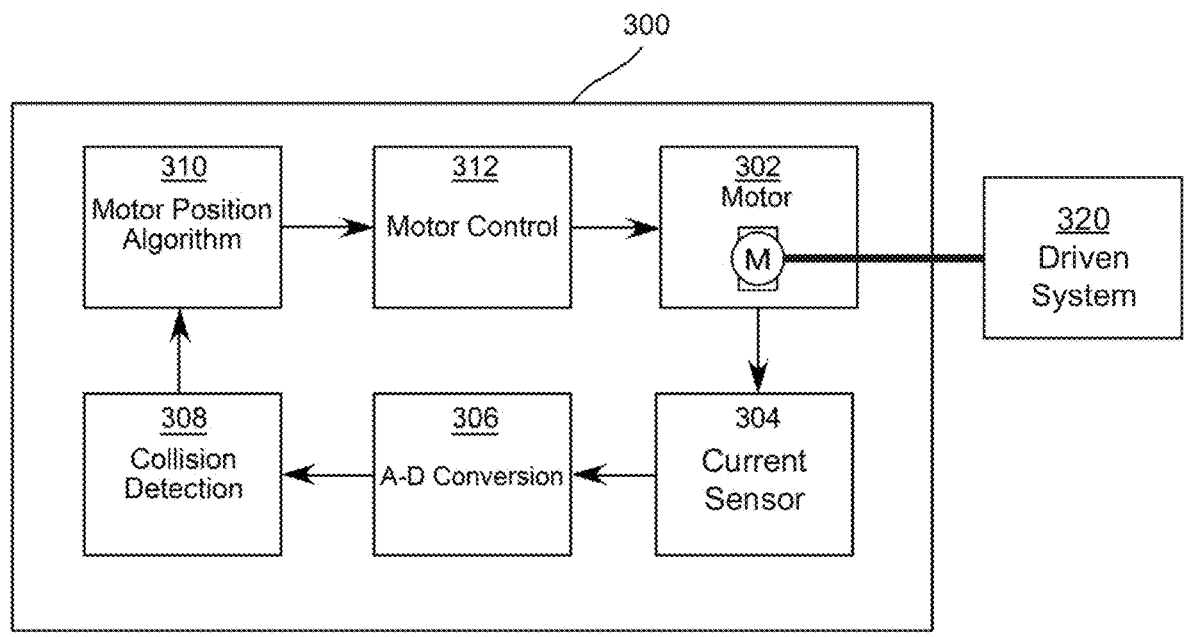
FIG. 3 presents a block diagram of a sensorless homing system according to the disclosure.

FIG. 3 presents a block diagram of a sensorless homing system 300 according to the disclosure. The sensorless homing system 300 is configured to determine a reference or 'home' position for a stepper motor 302. The stepper motor 302 is mechanically coupled to, and configured to move, a driven mechanical system 320. In various embodiments, the stepper motor 302 is coupled to the driven system 320 directly, by a belt and pulley, by a lead screw, by one or more gears, or by other suitable coupling for transferring motion of the stepper motor 302 to motion of the driven system 320. The driven system 320 may be any moving mechanism in the automated luminaire 12: one or more lenses, an arm comprising an optical device for insertion into a light beam, an iris, a moving luminaire head or yoke, a moving mirror, or other moving mechanism.

A motor position algorithm system 310 initiates a homing procedure by signaling a motor control system 312 to begin rotating the stepper motor 302 in a predetermined direction. The direction is predetermined to cause the driven mechanical system 320 to contact a preferred end stop to establish a home position. The stepper motor 302 (or circuitry electrically coupled to the stepper motor 302) includes a current sensor 304. In one embodiment of the disclosure, the current sensor 304 is configured to produce a signal relating to a voltage across a current sense resistor in series with a motor winding of the stepper motor 302. The signal produced by the current sensor 304 is electrically coupled to an A-D converter 306, and a digital output of the A-D convertor 306 is coupled to a collision detection system 308. The collision detection system 308 samples the digital output, storing multiple successive samples of the digital output to form a digital representation of a portion of a current waveform through the motor winding of the stepper motor 302. In some embodiments of the disclosure, the collision detection system 308 samples the output of the A-D converter 306 every 50 microseconds. The collision detection system 308 further continuously or intermittently compares the digital representation of the portion of the sampled current waveform with a corresponding portion of a digital representation of an expected current waveform, in order to detect a collision disturbance (as explained in further detail with reference to FIGS. 4-6).

When a collision disturbance is recognized by the collision detection system 308, it sends a signal to the motor position algorithm system 310, which logs the current position of the stepper motor 302 as an end stop and sends commands to the motor control system 312 to stop movement. Data relating to the position of the stepper motor 302 at the end stop is stored in a memory of the controller 200 as a home position. The sensorless homing system 300 may be implemented in the automated luminaire 12 by the controller 200.

Figure 4:
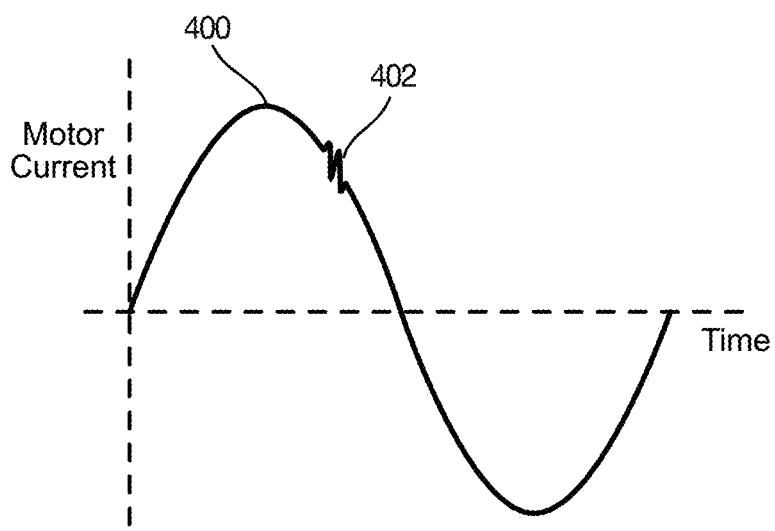
FIG. 4 presents an idealized graph of motor current versus time as a stepper-driven mechanical system contacts an end stop.

FIG. 4 presents an idealized graph of motor current 400 versus time (for example, for the stepper motor 302) as the driven mechanical system 320 contacts an end stop. The graph shows the motor current 400 on the y axis against time on the x axis. If the motor is running freely with no contact with an end stop, then the motor current 400 follows a smooth curve. However, if the end stop is contacted, a disturbance 402 occurs in the current signal. The collision detection system 308 examining the current signal recognizes the disturbance 402 and informs the motor position algorithm system 310 that an end stop has been contacted.

Figure 5:
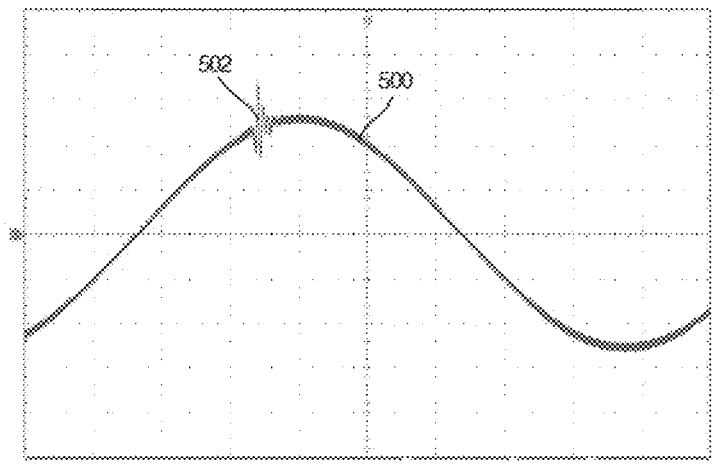
FIG. 5 shows an oscilloscope trace of an actual motor current versus time as a stepper-driven mechanical system contacts an end stop.
Figure 6:
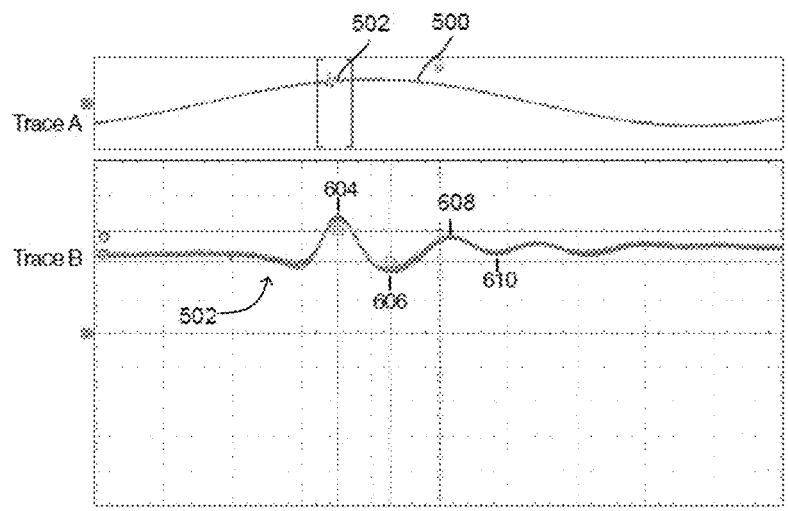
FIG. 6 presents in more detail the oscilloscope trace shown in FIG. 5.

FIGS. 5 and 6 show oscilloscope traces at differing horizontal and vertical scales of an actual motor current versus time (for example, for the stepper motor 302) as the driven mechanical system 320 contacts an end stop. FIG. 5 shows a current waveform 500 with a ringing signal (or disturbance) 502 indicating the occurrence of a contact. The current waveform 500 (excluding disturbance 502) represents a predicted (or expected) value of the actual motor current, as it is the current through the motor winding(s) absent contact of the driven system 320 with an end stop.

Trace A of FIG. 6 shows current waveform 500 and disturbance 502 at different horizontal and vertical scales from those used in FIG. 5. Trace B of FIG. 6 also shows an enlarged version of Trace A so that the disturbance 502 can be seen in detail.

The disturbance 502 appears to the collision detection system 308 as a series of ringing signals superimposed on top of an underlying smoothly changing expected waveform. The disturbance 502 occurs in a portion of the current waveform 500. In one embodiment of the disclosure the collision detection system 308 looks for peaks 604, 606, 608, and 610 to determine the portion of the current waveform 500 containing the disturbance 502. The collision detection system 308 calculates a characteristic of the disturbance 502 by detecting the values of peaks 604, 606, 608, and 610 from the expected value of the current in the portion of the current waveform 500. In such an embodiment, the collision detection system 308 determines that the disturbance 502 includes a second peak value (the peak 608). The collision detection system 308 responds to determining that the disturbance 502 meets this predefined criterion of collision with an end stop by signaling the motor position algorithm system 310 that an end stop has been reached. Looking for the characteristic of multiple peak values in the disturbance 502 and triggering only on the predefined criterion of a second (or later) peak value reduces the effect of electrical noise on the sensorless homing system 300 and reduces instances of accidental triggering.

In other embodiments, the collision detection system 308 may calculate one or more other characteristics of the disturbance 502 and determine whether such other characteristics meet other suitable predefined conditions to detect an end stop collision. Such other characteristics include (but are not limited to) a slope of the current waveform within the disturbance 502, a magnitude of one of the peaks in the disturbance 502, a frequency or wavelength between one or more peaks of the disturbance 502, or a combination of these and/or other characteristics of the disturbance 502.

In some such other embodiments of the disclosure, the sensorless homing system 300 is pre-characterized with a fundamental frequency of the disturbance 502 that is expected when an end stop is hit. The collision detection system 308 in such an embodiment is configured to calculate a frequency of the waveform of the disturbance 502, and trigger only when it is determined that the calculated frequency meets the predefined criterion of being within a threshold range of the fundamental frequency. The fundamental frequency of the ringing signal (disturbance) 502 may be different in two different mechanical drive systems, depending on mechanical designs of the two sensorless homing systems 300, specific stepper motors 302 used in the two systems 300, and the mass and construction of the two driven mechanical systems 320 driven by the two systems 300.

In such embodiments, the fundamental frequency for each motor and each driven mechanical system 320 may be measured or calculated during design and calibration of the mechanical system and/or the automated luminaire 12, and information relating to the fundamental frequency stored in the collision detection system 308 and/or into non-volatile memory 204 of the control system 200. In some such embodiments the half-power bandwidth of the fundamental frequency is measured and the threshold range of frequencies for triggering the collision detection system 308 is set to frequencies falling within the half-power bandwidth.

In some embodiments of the disclosure, the motor control system 312 selects a speed of the stepper motor 302 as it seeks an end stop so as to increase an accuracy of the system. In such embodiments, the motor control system 312 drives the stepper motor 302 at a slow speed when seeking the end stop. Doing so improves both the accuracy of the detection and reduces the amount by which the driven mechanical system 320 bounces back off the end stop upon contact.

In other embodiments, the speed at which the stepper motor 302 is driven while seeking the end stop may be selected so as to deliberately stimulate a fundamental frequency of the disturbance 502 that occurs upon contact with the end stop. As described above, the ringing signal 502 may have a fundamental frequency that is stimulated when the end stop is hit. An amplitude of the ringing waveform of the current disturbance 502 may therefore be maximized by stimulating this fundamental frequency. It may be determined that a particular homing movement speed, or range of speeds, stimulates this frequency to a greater extent than other movement speeds when the driven mechanical system 320 hits the end stop. Such a homing movement speed or speeds may be determined during design and calibration of the mechanical system or the automated luminaire 12, and information relating to the homing movement speeds stored in the collision detection system 308 and/or in non-volatile memory 204 of the control system 200.

In further embodiments, the accuracy of determining a reference or 'home' position for the stepper motor 302 may be further enhanced by carrying out multiple checks on the end stop. In one such embodiment, in a first phase, the sensorless homing system 300 rotates the stepper motor 302 at a first speed until the end stop is found, then reverses the stepper motor 302 for a predetermined period to back the driven system 320 away from the end stop, then in a second phase the sensorless homing system 300 rotates the stepper motor 302 at a second, slower speed to again drive the mechanism into the end stop.

In the second phase, the collision detection system 308 may compare the digital representation of the portion of the sampled current waveform with a corresponding portion of a digital representation of a second expected current waveform. Because of the lower speed in the second phase, the expected current waveform in the second phase may be different from the expected current waveform in the first phase. In the second phase, the collision detection system 308 may calculate one or more second characteristics of the disturbance 502 different than those used in the first phase, and may determine whether such second characteristic(s) meet one or more second suitable predefined conditions to detect the second end stop collision In the second phase, the end stop will be found with improved accuracy because of the slower speed, a lower momentum when striking the end stop, and less mechanical bounce of the mechanism against the end stop. In either a single-phase or a two-phase process, the mechanism may be required to move through its entire range of travel to reach the end stop. As such, the two-phase process enables the homing position to be found more quickly in the first phase, as it removes the requirement in a single-phase process to move at a slow speed while seeking the end stop.

While the disclosure has been described with respect to a limited number of embodiments, those skilled in the art, having benefit of this disclosure, will appreciate that other embodiments may be devised which do not depart from the scope of the disclosure herein. While the disclosure has been described in detail, it should be understood that various changes, substitutions and alterations can be made hereto without departing from the spirit and scope of the disclosure.

What is claimed is:

1. An automated luminaire, comprising:
a stepper motor;
a mechanism configured to be moved by the stepper motor; and
a control system coupled to the stepper motor and configured to:
rotate the stepper motor;
sense a value of a current passing through a motor winding of the stepper motor;
determine whether a portion of the sensed value of the current varies from an expected value of the current;
in response to determining that the portion of the sensed value of the current varies from the expected value of the current, calculate a characteristic of the portion of the sensed value of the current;
determine whether the calculated characteristic meets a predefined criterion, the predefined criterion representative of a collision of a mechanism moved by the stepper motor with an end stop of the mechanism; and
in response to determining that the calculated characteristic meets the predefined criterion, store data relating to a current position of the stepper motor in a memory of the control system.

2. The automated luminaire of claim 1, wherein the automated luminaire comprises a resistor electrically coupled in series with the motor winding of the stepper motor, and the control system senses the value of the current by measuring a voltage drop across the resistor.

3. The automated luminaire of claim 2, wherein the control system comprises an analogue-to-digital (A-D) converter electrically coupled to the resistor, the control system configured to intermittently sample a digital output of the A-D converter to obtain a signal relating to the sensed value of the current.

4. The automated luminaire of claim 3, wherein the control system samples the digital output of the A-D converter at intervals of 50 microseconds.

5. The automated luminaire of claim 3, wherein the control system is configured to:
store a plurality of successive samples of the digital output of the A-D converter;
determine that the plurality of samples varies from a corresponding plurality of expected values of the current; and
in response to such determination, determine that the mechanism has contacted the end stop by determining that a calculated characteristic of the plurality of samples meets a predefined criterion.

6. The automated luminaire of claim 5, wherein the control system is configured to calculate the calculated characteristic of the plurality of samples by detecting peak values in the plurality of samples, the predefined criterion being that the plurality of samples includes at least two peak values.

7. The automated luminaire of claim 5, wherein the control system is configured to calculate the calculated characteristic of the plurality of samples by calculating a frequency of the plurality of samples; the predefined criterion being that the calculated frequency is within a threshold range of a predefined fundamental frequency.

8. A method of determining a home position for a mechanism moved by a stepper motor, the method comprising:
rotating a stepper motor;
while rotating the stepper motor, sensing a value of a current passing through a motor winding of the stepper motor;
determining whether a portion of the sensed value of the current varies from an expected value of the current;
in response to determining that the portion of the sensed value of the current varies from the expected value of the current, calculating a characteristic of the portion of the sensed value of the current;
determining whether the calculated characteristic meets a predefined criterion, the predefined criterion representative of a collision of a mechanism moved by the stepper motor with an end stop of the mechanism; and
in response to determining that the calculated characteristic meets the predetermined criterion, storing data relating to a current position of the stepper motor in a memory of a control system coupled to the motor.

9. The method of claim 8, wherein:
calculating a characteristic of the sensed value of the current comprises detecting peak values in the portion of the sensed value of the current; and
determining whether the calculated characteristic meets the predefined criterion comprises determining whether the portion of the sensed value of the current includes at least two peak values.

10. The method of claim 8, wherein:
calculating a characteristic of the sensed value of the current comprises calculating a frequency of the portion of the sensed value of the current; and
determining whether the calculated characteristic meets the predefined criterion comprises determining whether the calculated frequency is within a threshold range of a predefined fundamental frequency.

11. The method of claim 10, wherein the motor is rotated at a speed selected to maximize an amplitude of the calculated frequency of the portion of the sensed value of the current.

12. The method of claim 8, wherein sensing a value of a current passing through a motor winding of the stepper motor comprises generating digital data relating to a voltage across a current sense resistor in series with the stepper motor winding.

13. The method of claim 12, wherein the current passing through a motor winding of the stepper motor is sensed at an interval of 50 microseconds.

14. The method of claim 8, wherein the motor is rotated at a speed selected to reduce an amount by which the mechanism bounces off the end stop upon contact.

15. A method of determining a home position for a mechanism moved by a stepper motor, the method comprising:
rotating a stepper motor at a first speed in a first direction;
while rotating the stepper motor, sensing a first value of a current passing through a motor winding of the stepper motor;
determining whether a first portion of the sensed first value of the current varies from a first expected value of the current;
in response to determining that the first portion of the sensed first value of the current varies from the first expected value of the current, calculating a first characteristic of the first portion of the sensed first value of the current;
determining whether the calculated first characteristic meets a first predefined criterion, the first predefined criterion representative of a collision of a mechanism moved by the stepper motor with an end stop of the mechanism;
in response to determining that the calculated first characteristic meets the first predetermined criterion, rotating the stepper motor in a second direction opposite from the first direction for a predetermined period;
after rotating the stepper motor in the second direction for the predetermined period:
rotating the motor in the first direction at a second speed, the second speed being slower than the first speed;
while rotating the stepper motor at the second speed, sensing a second value of the current passing through the motor winding of the stepper motor;
determining whether a second portion of the sensed second value of the current varies from a second expected value of the current;
in response to determining that the second portion of the sensed second value of the current varies from the second expected value of the current, calculating a second characteristic of the second portion of the sensed second value of the current;
determining whether the calculated second characteristic meets a second predefined criterion, the second predefined criterion representative of a second collision of the mechanism with the end stop of the mechanism; and
in response to determining that the calculated second characteristic meets the second predetermined criterion, storing data relating to a current position of the stepper motor in the memory of the control system coupled to the motor.

16. The method of claim 15, wherein the calculated second characteristic is different than the calculated first characteristic.

17. The method of claim 16, wherein the second predefined criterion is different than the first predefined criterion.

18. The method of claim 15, wherein:
calculating a second characteristic of the sensed second value of the current comprises detecting second peak values in the second portion of the sensed second value of the current; and
determining whether the calculated second characteristic meets the second predefined criterion comprises determining whether the second portion of the sensed second value of the current includes at least two second peak values.

19. The method of claim 15, wherein:
calculating a second characteristic of the sensed second value of the current comprises calculating a second frequency of the second portion of the sensed second value of the current; and
determining whether the calculated second characteristic meets the second predefined criterion comprises determining whether the calculated second frequency is within a threshold range of a predefined fundamental frequency.

20. The method of claim 19, wherein the second speed is selected to maximize an amplitude of the calculated second frequency of the second portion of the sensed second value of the current.

* * * * *